United States Patent [19]
Frania et al.

[11] 3,876,043
[45] Apr. 8, 1975

[54] CYLINDER MEANS FOR ACTUATING DISC BRAKES

[75] Inventors: Josef Frania, Hannover; Erhard Lehnert, Dollbergen, both of Germany

[73] Assignee: Westinghouse Bremsen- und Apparatebau, GmbH, Hannover, Germany

[22] Filed: Sept. 17, 1973

[21] Appl. No.: 397,702

[30] Foreign Application Priority Data
Nov. 4, 1972  Germany.............................. 2254090

[52] U.S. Cl................................ 188/153 A; 188/59
[51] Int. Cl............................................. B60t 13/10
[58] Field of Search........... 91/411 A, 411 R; 92/48; 188/52, 58, 59, 72.4, 72.6, 72.9, 153 A, 153 D, 153 R

[56] References Cited
UNITED STATES PATENTS

| | | | |
|---|---|---|---|
| 315,973 | 4/1885 | Strong.............................. | 188/153 R |
| 371,602 | 10/1887 | Lawrence........................ | 188/153 D |
| 3,489,022 | 1/1970 | Krahl................................ | 188/59 X |

*Primary Examiner*—Duane A. Reger
*Attorney, Agent, or Firm*—R. W. McIntire, Jr.

[57] ABSTRACT

Cylinder means for transmitting motion and force to linkage for actuating the pad members of a brake disc, said cylinder means including opposingly disposed brake-applying and brake-release pistons for imparting, respectively, brake-applying and brake-releasing forces to said linkage, said pistons being arranged in telescopic fashion relative to each other for conserving housing space required therefor.

9 Claims, 1 Drawing Figure

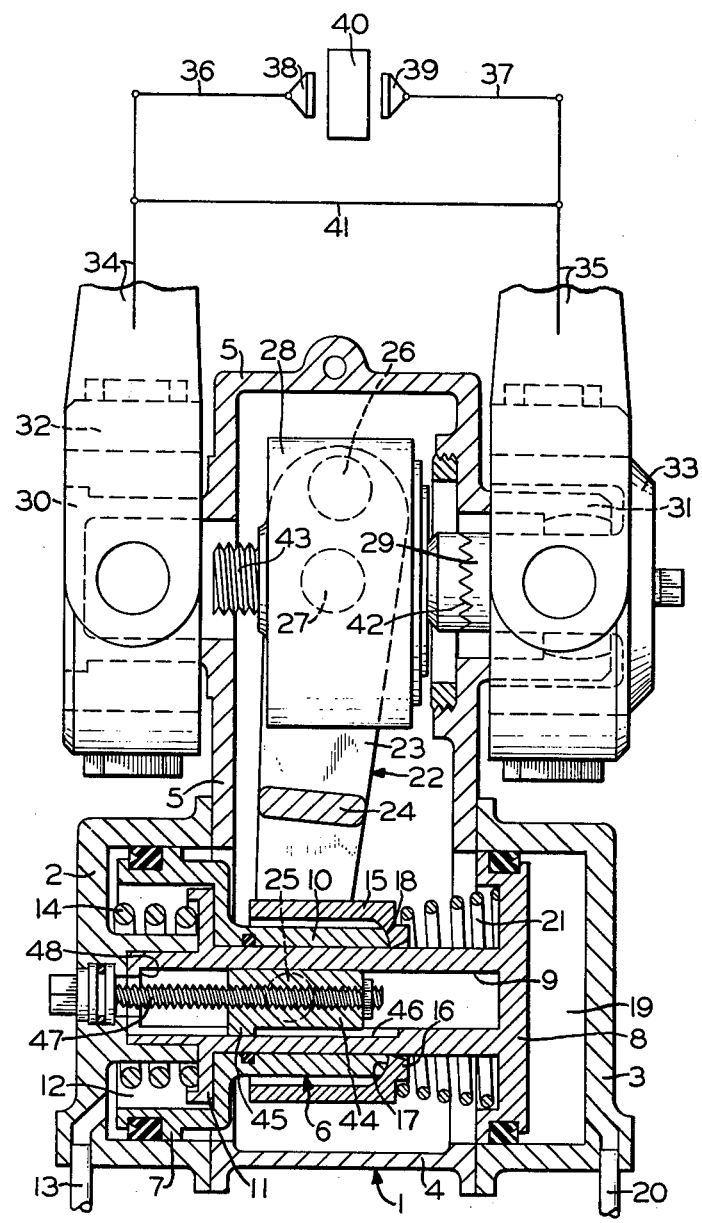

3,876,043

CYLINDER MEANS FOR ACTUATING DISC BRAKES

BACKGROUND OF THE INVENTION

Since conventional railway braking equipment is now designed to eliminate extensive brake rigging, that is the linkage through which brake-applying force is transmitted from the cylinder device to the brake shoes, brake units are now designed as compactly as possible to normally permit mounting of the entire brake unit within the confines of the wheel truck. It is highly desirable, therefore, to strive for compactness of the brake unit to avoid unforeseen space problems when installing the unit on the wheel truck.

SUMMARY OF THE INVENTION

The object of the present invention is to provide a brake unit, especially for use on railway vehicles, characterized by compactness of structure for facilitating installation thereof on the vehicle.

Briefly, the invention resides in the brake-operating cylinder portion of the brake unit and comprises opposingly disposed brake-applying and brake-releasing pistons arranged in telescopic fashion relative to each other, rather than in direct axial abutting relation, for conserving axial space. Moreover, the telescoped brake-applying and brake-release pistons are axially disposed and connected perpendicularly to an intervening transmission lever through which brake-applying and release motion and forces are transmitted to conventional brake lever linkage and finally to disc type brake pads acting on a brake disc. Support of the brake linkage at the point of connection to the brake-operating cylinder housing is arranged so that the angular mounting disposition of the housing may be varied according to the available space within the confines of the wheel truck.

The single FIGURE drawing is a plan view, primarily in section, of a brake-operating unit embodying the invention.

DESCRIPTION AND OPERATION

As shown in the drawing, the disc brake-operating unit comprises a multiple-section casing or housing 1 including a brake-operating cylindrical section 2 and a brake-release cylindrical section 3 respectively secured to opposite ends of a cylindrical intermediate section 4, all in axial alignment with each other. Housing 1 further comprises a transmission section 5 secured to intermediate section 4 in an axially perpendicular relation thereto.

Housing sections 2, 3, and 4 serve to house a piston assemblage 6 comprising an operating piston 7 reciprocably disposed in housing section 2 and a release piston 8 reciprocably disposed in housing section 3. Brake-release piston 8 is provided with a hollow piston rod 9 extending coaxially from one side thereof toward and into brake-operating section 2 through operating piston 7 such that a hollow sleeve portion 10 of smaller diameter than said operating piston and extending coaxially from the side thereof facing release piston 8 is slidably and sealingly accommodated on said piston rod.

The main portion of operating piston 7 is generally cupshaped, the bottom of which, that is the side opposite sleeve portion 10, is normally abuttingly and separably in contact with a concentric flange 11 formed in an axially fixed position on the adjacent end of piston rod 9 for a purpose to be hereinafter disclosed. The cup-like operating piston 7 cooperates with housing section 2 to form an operating pressure chamber 12 into which fluid pressure may be admitted via a fluid pressure supply pipe 13. An operating spring 14, disposed in chamber 12 within the cup-like portion of operating piston 7, is compressed between the end wall of housing section 2 and flange 11 of piston rod 9 for urging said operating piston in a rightwardly direction, as viewed in the drawing, for effecting a brake application.

Sleeve portion 10 of operating piston 7 extends coaxially into a hollow cup-like connecting member 15 coaxially surrounding and radially spaced apart from said sleeve portion. Connecting member 15 is provided, at the end adjacent release piston 8, with a radially inwardly extending flange 16 which closes around piston rod 9 to provide axially sliding contact therewith, said flange having formed internally thereon a partially rounded beveled annular surface 17 against which a complementary surface 18 formed on the free end of sleeve portion 10 of operating piston 7 makes separable abutting contact.

Release piston 8 cooperates with housing section 3 to form a release pressure chamber 19 which may be supplied with fluid pressure via a fluid pressure supply pipe 20. Release pressure in chamber 19 is opposed by a biasing spring 21 compressed between release piston 8 and connecting member 15, said spring thus acting to bias said connecting member into contact with sleeve portion 10 of operating piston 7.

Connecting member 15 provides a pivotal connection between operating piston 7 and a braking force transmitting or transmission lever 22 formed by two parallel arms 23 (only one of which is shown) rigidly connected to each other by an integrally formed connecting portion or webbing 24, said arms having the adjacent respective ends thereof pivotally secured to diametrally opposite sides of connecting member 15 by pins 25, only one of which is shown. In operation, which will be more fully described hereinafter, the complementary surfaces 17 and 18 permit limited rocking movement of connecting member 15 about the closed end 16 thereof and relative to the fixed axes of piston rod 9 and sleeve portion 10 to compensate for the variance in position, and consequently the distance therebetween, of pin 25 relative to said fixed axes during axial movement of piston assemblage 6 and consequent rotation of transmission lever 22 about fixed pin 26.

The ends of arms 23 of transmission lever 22 opposite the ends connected to connecting member 15 are pivotally anchored to opposite sides, respectively, of housing section 5 by pins 26, only one of which is shown. Each arm 23 of transmission lever 22 is also pivotally connected by respective pins 27, only one of which is shown, to opposite sides of a support block 28 in which a screw-threaded transfer rod 29 is adjustably disposed substantially perpendicularly to the axis of lever 22.

Housing section 5 has formed externally and on opposite sides thereof a pair of hub portions 30 and 31 in coaxial alignment with transfer rod 29. The hubs 30 and 31 support respective bearing members 32 and 33 coaxially rotatable thereon. Whereas bearing 32 is fixed against axial movement on hub 30, bearing 33 is axially slidable on hub 31 for a purpose to be hereinafter disclosed. Bearing 32 has one end of a dead lever 34 pivotally connected thereto, while bearing 33 has one end of a live lever 35 pivotally connected thereto, the axes of pivot of said lever being perpendicular to the axes of rotation of said bearings, respectively.

Transfer rod 29 is connected to bearing member 33 so that any axial motion and force, either for applying or releasing the brakes, transmitted to said rod is transferred thereby to said bearing member and hence to the end of live lever 35 connected to the bearing member. Since, as was noted above, bearing member 33 is free to move axially on hub 31, such axial movement thereof causes the end of live lever 35 to be displaced laterally.

The ends of dead lever 34 and live lever 35 opposite the ends connected to bearings 32 and 33 have connected thereto one end of each of respective brake rods 36 and 37, the opposite ends of said brake rods having attached thereto brake shoes or pads 38 and 39, for frictionally clasping a brake disc 40, which is carried on a vehicle wheel (not shown). A connecting rod 41 has the opposite ends thereof pivotally connected to dead lever 34 and live lever 35 between the ends of said levers. In conventional manner, therefore, lateral movement of live lever 35 to the right, as viewed in the drawing, causes brake rods 36 and 37 to move inwardly for engaging the brake pads 38 and 39 with brake disc 40, whereas lateral movement of said live lever to the left, causes the brake pads to be withdrawn from the brake disc.

The correct amount of interrelated movement among the several lever and rod members 29, 34, 35, 36, 37 and 41 comprising the brake operating linkage may be adjusted by the threaded transfer rod 29 in which a gear tooth coupling 42 is interposed. Although not illustrated in detail because it is not deemed essential to an understanding of the invention, transfer rod 29 may be separated at gear coupling 42 to permit a screw-threaded portion 43 of said transfer rod to be axially adjustable within support block 28, thereby adjusting the effective length of said transfer rod and consequently the interrelated movement of the brake operating linkage members. After proper adjustment of transfer rod 29 has been accomplished, gear coupling 42 is restored to its engaged position, in which it is shown, and may be retained in such engaged position by any suitable means such as biasing means (not shown).

In operation of the apparatus embodying the invention, it may be assumed that, with the vehicle in motion, the brakes, that is the pads 38 and 39, are in a released disposition in which operating chamber 12 is free of fluid pressure and release chamber 19 is charged with fluid at a normal predetermined pressure sufficient for overcoming the force of operating spring 14 and thereby retaining operating piston 7 in a release position in which it is shown. Pressure in release chamber 19 acts against operating spring 14 through release piston 8, spring 21, connecting member 15, sleeve portion 10, and operating piston 7 acting through flange 11 to retain said operating piston in its release position in which transmission lever 22 exerts no brake-applying force on rod 29.

In order to effect a brake application, fluid pressure is introduced into operating chamber 12 at a preselected degree corresponding to the degree of application desired. Pressure in chamber 12, along with the force of operating spring 14, acts through operating piston 7 and connecting member 15 for overcoming the combined resistance of spring 21 and pressure in release chamber 19, thus causing said connecting member to be moved axially in a right-hand direction, as viewed in the drawing. Since transmission lever 22 is connected to connecting member 15, rightward movement of said connecting member causes transmission lever 22 to be pivoted in a counterclockwise direction about pin 26 which, in turn, imparts a rightwardly directed force and movement to transfer rod 29, thus producing rightward lateral movement of live lever 35. Such movement of lever 35, as above noted, actuates the brake-operating linkage for bringing brake pads 38 and 39 into frictional contact with brake disc 40.

If it is desired to reduce the degree of or completely release the brake application in effect, pressure in application chamber 12 is reduced an amount in accordance with the results desired. Prevailing pressure in release chamber 19, as above described, would counteract the combined opposing effort of operating spring 14 and pressure in chamber 12 for reducing the degree of force transmitted by transmission lever 22 to transfer rod 29 accordingly.

In the event of a failure of fluid pressure, the apparatus embodying the invention operates automatically for effecting an emergency brake application. Upon failure of fluid pressure in both operating chamber 12 and release chamber 16, operating spring 14, acting on operating piston 7 through flange 11, and spring 21, acting on release piston 8, cooperates in forcing the entire piston assemblage 6 in a rightwardly direction for effecting a brake application in the manner above described in connection with normal operations.

If it is desired to release the brake while the fluid pressure failure is in effect, a manually operable brake-release mechanism is provided for such a purpose. The manually operable release mechanism comprises a nut 44 slidably axially movable within the hollow piston rod 9, said nut being held against rotation within said piston rod by a detent 45 formed on the outer periphery of said nut and riding in a longitudinal groove 46 formed in the inner wall of said piston rod. A screw member 47, accessible from the outside of casing section 2 but fixed against axial movement relative thereto, is screwed into nut 44 such that rotation of said screw causes axial displacement of said nut in a direction corresponding to the direction in which the screw is turned. The end of screw member 47 is shaped such that a wrench may be applied thereto for turning the screw as desired. Thus, if an emergency brake application has occurred, piston rod 9 occupies a position to the right relative to casing section 2. By turning screw 47 (which it is assumed has a right-handed thread) counterclockwise, nut 44 is moved leftwardly in piston rod 9 to engage an inwardly extending radial shoulder 48 formed at the left-hand end of said piston rod and thereby moving said piston rod with it to cause operating spring 14 to be compressed between flange 11 and the end wall of casing section 2.

With spring 14 compressed, spring 21, acting through connecting member 15, becomes effective for moving said connecting member, along with operating piston 7, to the left, thereby causing counterclockwise rotation of transmission lever 22 and consequent relaxation of the brake linkage and release of the brakes, as above explained.

As was above set forth, bearing members 32 and 33 are rotatable about the hubs 30 and 31, respectively. This arrangement permits swinging of the entire housing 1 about the common axis of the hubs 30 and 31, so that the angular position of the braking unit, when being installed, may be set at the most convenient angle permitted by available space for installation.

Having now described the invention, what we claim as new and desire to secure by Letters Patent, is:

1. Cylinder means for actuating vehicle brakes including brake shoes and lever linkage through which brake-applying force is transmitted to the brake shoes, said cylinder means comprising:
    a. a housing;
    b. a piston assemblage operably disposed in said housing and including a pair of axially aligned pistons arranged in a telescoping and opposing relationship with each other,
    c. one of said pistons being subjectable to operating fluid pressure for urging axial movement of said piston assemblage in one direction and the other piston being subjectable to release fluid pressure in opposition to said operating fluid pressure for urging axial movement of said piston assemblage in an opposite direction relative to said one direction, the movement of said piston assemblage in said one direction or said opposite direction being determined by the dominating one of said operating and release fluid pressures; and
    d. transmission means operably connected to said piston assemblage for transmitting movement to the lever linkage and the brake shoes for either effecting a brake application or a brake-release in accordance with the direction of said axial movement of the piston assemblage.

2. Cylinder means for actuating vehicle brakes, as set forth in claim 1, wherein said transmission means comprises a transmission lever having one end pivotally connected to said piston assemblage and the opposite end rotatably anchored at a fixed point in said housing, said transmission lever being pivotally connected between its said one end and its said other end to the lever linkage.

3. Cylinder means for actuating vehicle brakes, as set forth in claim 2, wherein said transmission lever is disposed substantially perpendicularly to the axis of said piston assemblage.

4. Cylinder means for actuating vehicle brakes, as set forth in claim 3, further characterized by a connecting member interposed between said piston assemblage and said one end of said transmission lever, said connecting member rockable about its own axis to compensate for variance in relative distance occurring between said one end of said transmission lever and the axis of said piston assemblage during axial movement of the piston assemblage and consequent rotation of said transmission lever about said fixed point in said housing.

5. Cylinder means for actuating vehicle brakes, as set forth in claim 2, wherein said transmission means comprises a transfer rod interposed between and interconnecting said transmission lever and the lever linkage, said transfer rod including means for varying the length thereof.

6. Cylinder means for actuating vehicle brakes, as set forth in claim 4, wherein said piston assemblage comprises:
    a. a release piston subjectable on one side to said release fluid pressure and having a hollow piston rod extending coaxially from the opposite side thereof;
    b. an operating piston subjectable on one side to said operating fliud pressure and having a hollow sleeve portion extending from the opposite side thereof, said hollow sleeve portion being telescopically slidable on said hollow piston rod,
    c. said connecting member coaxially surrounding said sleeve portion with a radial annular space therebetween and one end closing around the hollow piston rod in abutting contact with the sleeve portion; and
    d. a biasing spring compressed between said one end of said connecting member and said opposite side of said release piston for urging said operating piston and said release piston axially apart.

7. Cylinder means for actuating vehicle brakes, as set forth in claim 6, wherein said piston assemblage further comprises an operating spring compressed between the housing and said one side of said operating piston for assisting said operating fluid pressure in urging axial movement of the piston assemblage in said one direction, said operating spring being cooperatively effective with said operating fluid pressure, upon failure of said release fluid pressure, for effecting an emergency application of the brakes.

8. Cylinder means for actuating vehicle brakes, as set forth in claim 7, wherein said hollow piston rod is provided with a radially disposed flange interposed between said operating spring and said one side of said operating piston for effecting unified motion of said operating piston and said release piston during axial movement of the piston assemblage in said one direction.

9. Cylinder means for actuating vehicle brakes, as set forth in claim 7, further characterized by manually operable screw means disposed in said hollow piston rod and operably accessible exteriorally of said casing, said manually operable screw means being operable, when rotated in one direction, for abuttingly engaging said piston rod and causing axial movement of the piston assemblage in said opposite direction for effecting a brake release.

* * * * *